United States Patent [19]

Yamashita

[11] Patent Number: 4,795,955
[45] Date of Patent: Jan. 3, 1989

[54] POSITION CONTROL APPARATUS

[75] Inventor: Kazutaka Yamashita, Numazu, Japan

[73] Assignee: Toshiba Kikai Kabushiki Kaisha, Tokyo, Japan

[21] Appl. No.: 920,062

[22] Filed: Oct. 17, 1986

[30] Foreign Application Priority Data

Oct. 17, 1985 [JP] Japan .................... 60-232107

[51] Int. Cl.$^4$ .......................... G05D 23/275
[52] U.S. Cl. .................... 318/632; 318/561; 318/563
[58] Field of Search .......... 318/632, 561, 563; 340/347 P; 364/170

[56] References Cited

U.S. PATENT DOCUMENTS

| | | | |
|---|---|---|---|
| 4,484,287 | 11/1984 | Gamo et al. | 364/474 |
| 4,502,108 | 2/1985 | Nozawa et al. | 364/170 |
| 4,504,832 | 3/1985 | Conte | 340/347 P |
| 4,575,666 | 3/1986 | Nakashima | 318/661 |

Primary Examiner—William M. Shoop, Jr.
Assistant Examiner—Saul M. Bergmann
Attorney, Agent, or Firm—Cushman, Darby & Cushman

[57] ABSTRACT

In a position control apparatus for a table of a machine tool, for example, wherein the position of the table is detected by a position detector and a difference between a detected position and an instructed position is used to control the speed of a driving motor of the table, the position detector is constructed as an absolute type. Further, there is provided an error correcting device producing a correction value corresponding to an instructed position or a detected position. During starting, the correction value is added to the absolute value and the sum is used to update an instructed position register.

5 Claims, 2 Drawing Sheets

POSITION CONTROL APPARATUS

BACKGROUND OF THE INVENTION

This invention relates to apparatus for controlling the position of the table of a machine tool, for example, and more particularly to apparatus for correcting a mechanical error of a driving system for driving a table or the like, and a pitch error of a position detector or the like.

To control the position of the table of a machine tool, apparatus shown in FIG. 3 has been used. In the apparatus shown in FIG. 3, an increment type position detector 24 is connected to an electric motor 23 which moves a table 21 in the horizontal direction through a well known ball screw 22, and the displacement data detected by position detector 24 is supplied to a detected position register 25 storing the absolute position reached by a previous movement (or an initial position set after the table has returned to an original position at the time of closing a source switch). The content of the register 25 is subtracted from the content of an instructed position register 26 by using a subtractor 27, and based on a difference thus obtained, the motor 23 is controlled through speed control apparatus 28. Position detection for feedback is made by indirectly detecting the position of table 21 by a position detector 24 provided for motor 23 so that the actual position of the table 21 and the detected position do not always coincide with each other due to errors caused by the accuracies of the ball screw 22 and the position detector 24, thus disenabling to accurately move table 21 to an instructed position.

For eliminating this problem, an error correction device 29 has been provided wherein the error between the actual position and the detected position of table 21 corresponding to the instructed position or the detected position is measured by a high precision measuring device so as to store the measured error in an error table or a circuit is constructed so that an approximate correction value or signal can be obtained. The errors or differences between the actual position and the detected position of the table can be made to cancel with ecch other by correcting the instructed position or detected position previously used with a corresponding error data so that it is possible to correctly move the table 21 to the instructed position.

However, with the prior art driving apparatus utilizing an increment type position detector, it can detect only relative movement data so that in order to obtain absolute position data, it is necessary to use an absolute position utilized as a reference. Accordingly, for setting the reference point of the increment type position detector it is necessary to return the driving device after closing the source switch, thus requiring an initializing operation for storing an initial value acting as an origin in the detected position register and an instructed position register 26, thus decreasing the operating efficiency.

SUMMARY OF THE INVENTION

Accordingly, it is an object of this invention to provide high accuracy position control apparatus capable of eliminating the origin returning operation at the time of closing the source switch.

According to this invention, there is provided a position control apparatus of the type including a source of drive for moving a driven member, position detecting means provided for the source of drive or the driven member for detecting a position thereof, and speed control means for operating the source of drive according to a difference between the position detected by the position detecting means and an instructed position from the outside, characterized in that the position detecting means comprises an absolute type position detecting means, and that the position control apparatus further comprises an error correcting means for producing a correction signal corresponding to the instructed position or the detected position, means for adding the correction signal to a position signal detected by the absolute type position detecting means to produce a sum signal, and means for applying the sum signal to the means for storing the instructed position for updating the same.

DESCRIPTION OF THE PREFERRED EMBODIMENT

With reference to the position control apparatus of this invention will now be described taking an example wherein the invention is applied to the positioning control of the table of a NC machine tool.

Figure 3:
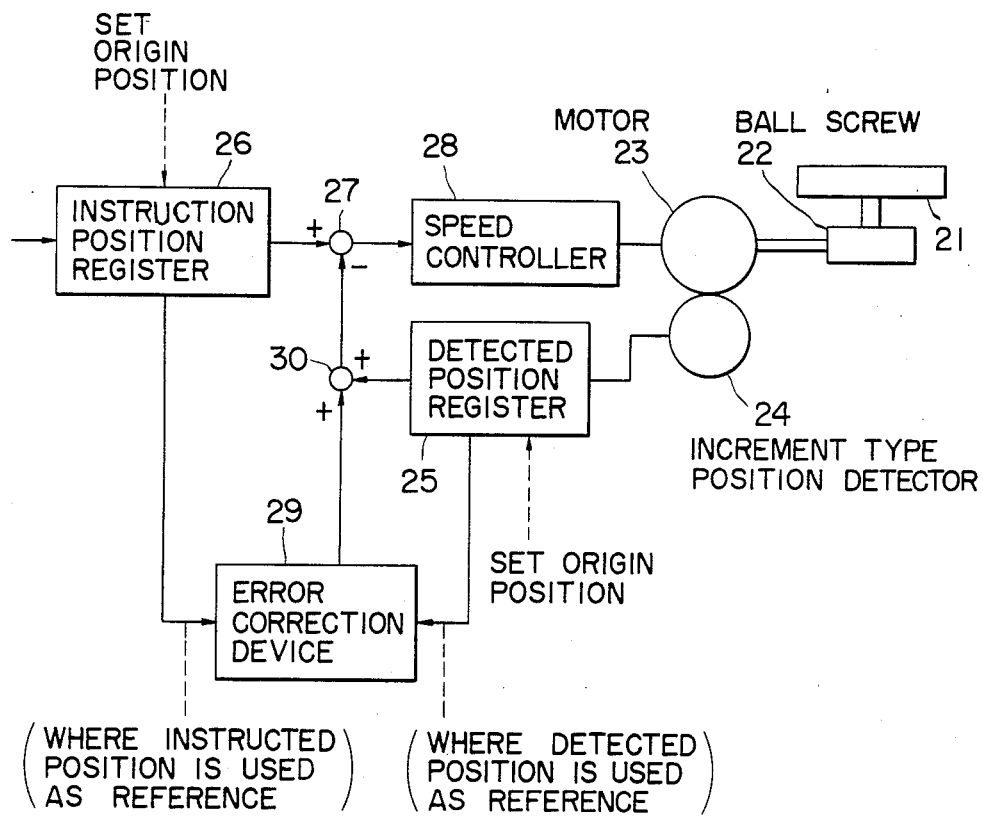
FIG. 3 is diagram showing prior art position control apparatus.

Similar to FIG. 3, the table 1 of the NC machine tool is moved in the horizontal direction by an electric motor 3 through a ball screw 2. A linear position detector 11 capable of directly detecting the position of the table 1 (that is a detector that can detect the absolute value of the position of table 1) is provided for the table, and a resolver 4 is connected to motor 3 for precisely measuring the present position of table 1 based on the angle of rotation of motor 3 or ball screw 2. The data detected by resolver 4 and linear position detector 11 are applied to a position calculator 12 so as to calculate the absolute position of the table 1. The absolute position thus calculated is applied to a detected position register 5 and then corrected by a correction value sent from an error correction device 9 in an adder 10.

For the purpose of correcting the table 1 to the accurate position, the error correction device 9 contains an error table or approximate function generator so that an error data obtained by comparing the content of the detected position detector 5 when the table is at any position in its range of movement with an actual position measured by an independent measuring device of high accuracy can be set at a correct position of table 1 corresponding to any detecting position during operation of the machine tool.

Figure 4:
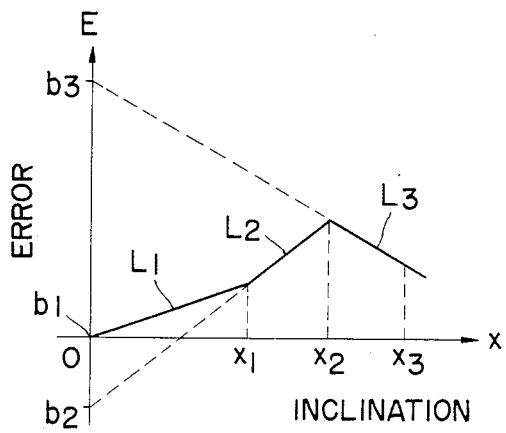
FIG. 4 is a plot useful to explain a function generator.

FIG. 4 is a graph for explaining the operation of a function generator in which the ordinate designates error E, and the abscissa represents distance from an origin, in which L1, L2, L3, ... are segments of an error curve obtained by approximating curved segments of the error curve to straight line segments. Denoting the inclinations of segments L1, L2, L3 by a1, a2, a3, ... and the coordinate values at which extensions of segments intersect the ordinate by b1, b2, b3, ..., we obtain Error for segment L1 = a1·x − b1  (0 ≦ x ≦ x1)

Error for segment L2 = a2·x + b2  (x1 ≦ x ≦ x2)

Error for segment L3 = a3·x + b3  (x2 ≦ x ≦ x3).

This error function system can decrease the capacity of a memory device than a system in which error quantities at respective positions x1, x2, x3, . . . are stored in the memory device as an error table.

An error data concerning the detected position is sent to adder 10 to be added with the output of the detected position register 5. The output of the adder 10 is subtracted from an instruction signal from an instructed position register 6 by a subtractor 7. Further, the output signal of the error correction device 9 is applied to the instructed position register for initializing the same at the time of closing the source switch. The output of subtractor 7, that is, the difference between an instructed position and a detected position is sent to a speed controller 8 for driving motor 3.

In the apparatus described above the absolute position of table 1 at the inital state is calculated by position calculator 12 by using data detected by the linear position detector 11 and resolver 4. The absolute position calculated by position calculator 12 is sent to detected position register 5 and then added, by adder 10, to the output signal of the error correction device 9 utilizing the function generator shown in FIG. 4. When a movement instruction is issued by a NC apparatus, the content of the instructed position register 6 is renewed by the movement instruction. As a consequence, the motor 3 is operated by a difference between an instructed position in the instructed position register 6 and a corrected content of the detected position register 5 so as to drive table 1 through ball screw device 2. The position of the moving table 1 is detected by linear position detector 11 and resolver 4 and the absolute position is calculated by the position calculator 12. Then the absolute position is corrected to an accurate absolute position by error correction device 9, and the corrected absolute position is compared with the instructed position with subtractor so that it is possible to accurately drive the table 1 to the instructed position.

In the foregoing embodiment, since linear position detector 11 acting as an absolute position detector and resolver 4 are used, returning operation to the original point of table 1 immediately after closing the source switch is not necessary thereby improving the operating efficiency. Moreover, since the initial position of the table 1 is written into instructed position register 6 immediately after closing the source switch, the table 1 can be started smoothly from the initial position. Further, as the detected position is corrected by a function type error correction device 9 it is possible to accurately move the table 1 to the instructed position at a high speed.

Figure 2:
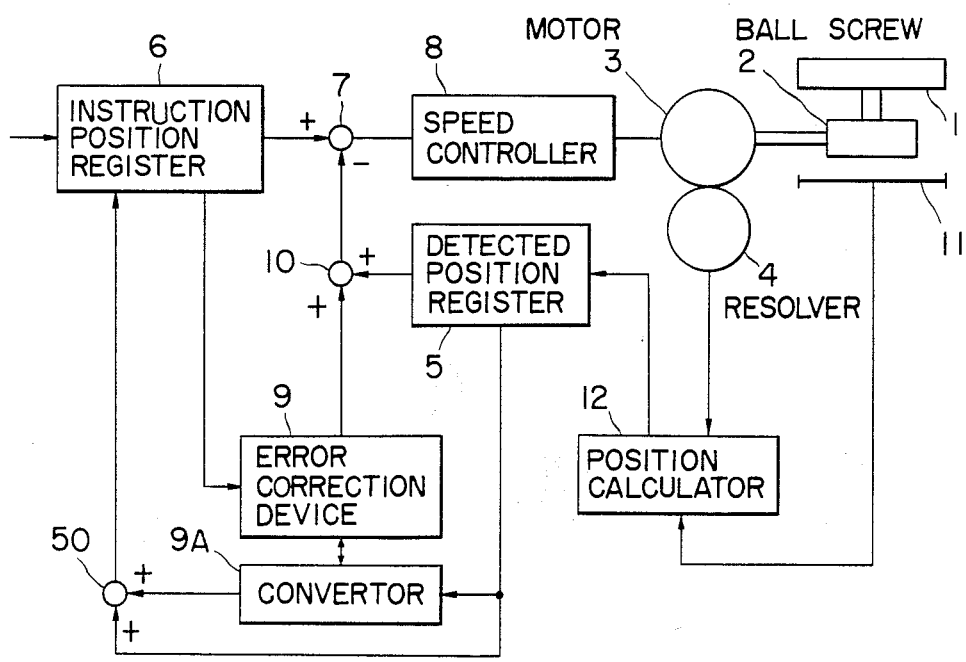
FIG. 2 is a block diagram showing a modified embodiment of this invention.

Although in the foregoing embodiment, an error correcting device 9 utilizing a detected position as a reference was used, in another embodiment of this invention shown in FIG. 2, the error correction device 9 utilizing an instructed position as a reference, and a converter 9A are used. More particularly, the error correction device 9 is connected to the instructed position register 6 and the detected position register 5 is connected to the converter 9A connected to the error correction device 9.

Figure 1:
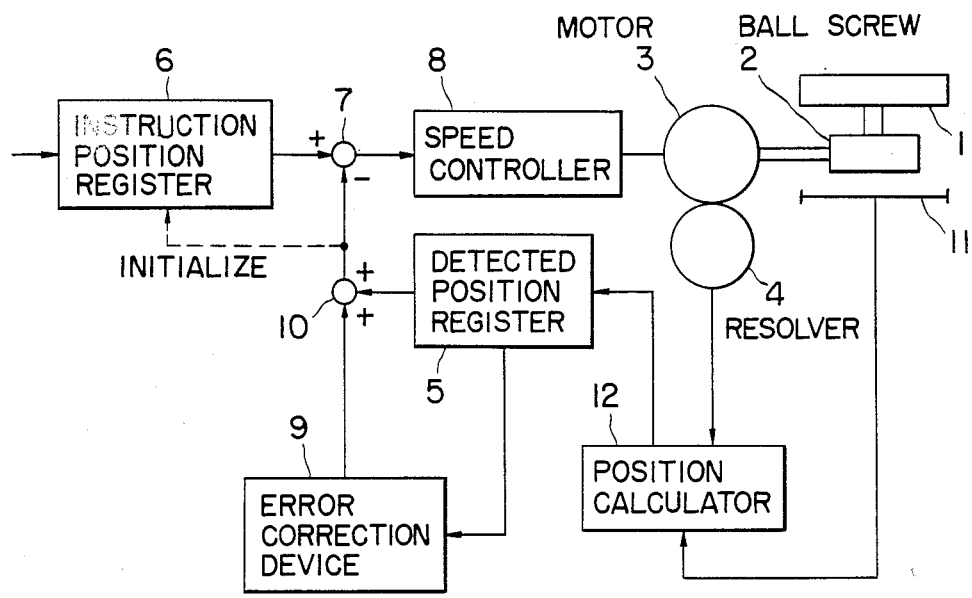
FIG. 1 is a block diagram showing a preferred embodiment of the position control apparatus according to this invention.

In this embodiment, the position calculator 12 calculates the absolute position based on the data detected by linear type position detector 11 and resolver 4 just like the first embodiment shown in FIG. 1. The absolute value thus calculated is written into the detected position register 5 and then sent to the converter 9A which in response to the output of the error correction device 9 determines a value which represents the detected position corrected by the error correction device 9. The output of the converter 9A is added to the output of the detected position detector 5 by an adder 50, the output thereof being used to update the instructed position register 6. A movement instruction from the NC device is used to rewrite the instructed position register 6. In accordance with the content of the instructed position register 6, the machine tool is started and the table 1 is correctly moved to the instructed position by repeating detection and driving until the instructed position corrected by the error correction device 9 and the detected position coincide with each other.

In the second embodiment, since the output of the error correction device 9 is converted by converter 9A when setting the instructed position register 6 at the time of closing the source switch, it is necessary to effect a correction different from that effected during normal operation. Accordingly, the construction of the second embodiment is a little more complicated than that of the first embodiment. However, the advantages of the first embodiment that it is not necessary to return the table 1 to the original position and the other advantages can also be provided. In addition, the correction effected by the error correction device 9 can be made at a higher speed than the first embodiment in which the correction is made during the movement of table 1.

It should be understood that the position detector is not limited to a linear type position detector 11 and a resolver 4 shown in the foregoing embodiments and that the resolver can be substituted by an Inductsyn, a magnetic scale or an absolute type encoder. Instead of using a combination of the linear type position detector 11 and the resolver, a high accuracy absolute encoder may be provided for the motor 3. Any absolute type position detector can be used. As the error correction device 9 was used a function type error correction device capable of effecting approximate correction by using functions, but where an error table type error correction device is used, although the processing speed decreases due to complicated processings, corrections of higher accuracies are possible. A combination of both types of the error correcting device can be used in which the function type is used principally and only the error data regarding a specific point which cannot be corrected by approximation is used as an error table. By using such a combination it is possible to effect correction at a high speed and high accuracy.

What is claimed is:
1. A position control apparatus comprising:
a source of drive for moving a driven member;
absolute position detecting means provided for either one of said source of drive and said driven member for detecting an absolute position thereof;
an instruction position register for storing a supplied instructed position; and
speed control means for said source of drive;
the improvement wherein said absolute position detecting means comprises a resolver provided for said motor, a linear type position detector provided for said driven member, and means for obtaining an absolute position of said member in accordance with outputs of said resolver and said linear type position detector; and said apparatus further comprising error correcting means for producing a correction signal corresponding to a detecting position; means for adding said correction signal to a position signal detected by the said absolute position detecting means to produce a sum signal; and subtracting means for subtracting said sum signal from an instruction position signal delivered from said instruction position register, for producing a difference therebetween.

2. The position control apparatus according to claim 1 wherein said absolute position detecting means comprises a resolver provided for said motor and a linear type position detector provided for said driven member and means for obtaining an absolute position of said member in accordance with outputs of said resolver and said linear type position detector.

3. The position control apparatus according to claim 1 wherein said absolute position detector comprises an absolute type linear encoder.

4. The position control apparatus according to claim 1 further comprising a converter connected to said error correcting means and to said absolute position detecting means, and an adder for adding together outputs of said converter and said absolute position detecting means to produce a signal for updating said instruction position register.

5. The position control apparatus according to claim 1, further comprising means for applying said sum signal to said instruction position register for updating the same.

* * * * *